United States Patent
Liu et al.

(10) Patent No.: US 11,879,585 B2
(45) Date of Patent: Jan. 23, 2024

(54) THERMAL INSULATION CABINET, AND METHOD FOR PREPARING SAME AND REFRIGERATOR HAVING SAME

(71) Applicants: QINGDAO HAIER REFRIGERATOR CO., LTD., Qingdao (CN); HAIER SMART HOME CO., LTD., Qingdao (CN)

(72) Inventors: Zhanzhan Liu, Qingdao (CN); Peng Li, Qingdao (CN); Yuanfeng Gao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 17/916,549

(22) PCT Filed: Feb. 1, 2021

(86) PCT No.: PCT/CN2021/074600
§ 371 (c)(1),
(2) Date: Sep. 30, 2022

(87) PCT Pub. No.: WO2021/196861
PCT Pub. Date: Oct. 7, 2021

(65) Prior Publication Data
US 2023/0151922 A1   May 18, 2023

(30) Foreign Application Priority Data
Mar. 30, 2020 (CN) .......................... 202010236108.6

(51) Int. Cl.
B29C 44/34 (2006.01)
F16L 59/065 (2006.01)
(Continued)

(52) U.S. Cl.
CPC ............ *F16L 59/065* (2013.01); *B29C 44/18* (2013.01); *B29C 44/3415* (2013.01);
(Continued)

(58) Field of Classification Search
None
See application file for complete search history.

(56) References Cited

U.S. PATENT DOCUMENTS 7,571,582 B2 * 8/2009 Hirai .................. F16L 59/065
428/69
2016/0282009 A1  9/2016 Combs

FOREIGN PATENT DOCUMENTS

CN 1342255 A 3/2002
CN 1426363 A 6/2003
(Continued)

*Primary Examiner* — Alexander S Thomas
(74) *Attorney, Agent, or Firm* — Cheng-Ju Chiang

(57) ABSTRACT

A thermal insulation cabinet and a manufacturing method therefor, and a refrigerator having same. The manufacturing method for the thermal insulation cabinet comprises the following steps: pre-assembling a shell having a vacuum insulation panel attached to the inside, into a cabinet shell; heating the inside of the cabinet shell; and injecting a foaming material between the cabinet shell and an inner liner for foaming. According to the present invention, the inside of the cabinet shell is heated, such that the inner surface of the shell can reach a target temperature required for foaming, thereby reducing or avoiding a surface crusting phenomenon, and improving a thermal insulation effect of the thermal insulation cabinet.

8 Claims, 2 Drawing Sheets

(51) Int. Cl.
  *B29C 44/18* (2006.01)
  *B65D 81/38* (2006.01)
  *F25D 23/06* (2006.01)
  *B29L 31/00* (2006.01)

(52) U.S. Cl.
  CPC ..... *B65D 81/3818* (2013.01); *B65D 81/3823* (2013.01); *F25D 23/062* (2013.01); *B29L 2031/7622* (2013.01)

(56) References Cited

FOREIGN PATENT DOCUMENTS

| | | | | |
|---|---|---|---|---|
| CN | 1659402 | A | 8/2005 | |
| CN | 101072968 | A | 11/2007 | |
| CN | 103448191 | A | 12/2013 | |
| CN | 203485356 | U | 3/2014 | |
| CN | 103968191 | A | 8/2014 | |
| CN | 104006264 | A | 8/2014 | |
| CN | 109968580 | A | 7/2019 | |
| CN | 110779255 | A | 2/2020 | |
| EP | 3278949 | A1 * | 2/2018 | ........... B29C 44/188 |
| JP | 2002-172645 | A | 6/2002 | |
| JP | 2009-83906 | A | 4/2009 | |

\* cited by examiner

THERMAL INSULATION CABINET, AND METHOD FOR PREPARING SAME AND REFRIGERATOR HAVING SAME

CROSS REFERENCE TO RELATED APPLICATIONS

This application is a 35 U.S.C. § 371 National Phase conversion of International (PCT) Patent Application No. PCT/CN2021/074600, filed on Feb. 1, 2021, which claims priority to Chinese Patent Application No. 202010236108.6, filed on Mar. 30, 2020, the disclosure of which is here incorporated by reference in its entirety. The PCT International Patent Application was filed and published in Chinese.

TECHNICAL FIELD

The present invention relates to the field of foaming technologies, and particularly relates to a thermal insulation cabinet, and a method for preparing the same and a refrigerator having the same.

BACKGROUND

Currently, a large volume is one of the users' requirements for a refrigerator, so the pursuit of a larger volume ratio has become one of the main directions of refrigerator research and development. Under the condition of the same external dimensions, an effective means to increase the volume in most cases is to thin a heat preservation layer and replace a foaming material with a vacuum insulation panel having a better heat preservation effect, so as to strike a balance between the larger volume and energy saving.

Usually, the heat preservation layer can be thinned to ⅓ or ½ of the original thickness by attaching the vacuum insulation panel to a U-shell or a back panel. A traditional process for cabinet foaming includes the following steps: pre-installing a cabinet, preheating the cabinet with hot air, and enabling the cabinet to enter a mould for foaming. However, due to the fast line rhythm of the refrigerator, the cabinet is preheated for a short period of time; and since the vacuum insulation panel is a poor conductor of heat, the preheating temperature on the side of the vacuum insulation panel facing the foaming material is not enough, resulting in serious skinning of the foaming material on the surface of the vacuum insulation panel, which adversely affects the energy-saving effect.

In view of this, it is necessary to provide a thermal insulation cabinet, and a method for preparing the same and a refrigerator having the same, so as to solve the above problems.

SUMMARY

The present invention aims to solve at least one of the technical problems in the prior art, thereby providing a thermal insulation cabinet, and a method for preparing the same and a refrigerator having the same.

To fulfill one of the objectives of the present invention, the technical solutions of the present invention are described as below.

A method for preparing a thermal insulation cabinet, comprising the following steps:
pre-assembling a shell having a vacuum insulation panel attached to an inner side into a cabinet shell;
heating an inside of the cabinet shell; and
injecting a foaming material between the cabinet shell and an inner liner for foaming.

Further, wherein the inside of the cabinet shell is heated by blowing hot air to the inside at a foaming material injection hole of the cabinet shell.

Further, wherein the hot air is blown to the inside at the foaming material injection hole by a hot air gun.

Further, wherein a temperature of the hot air ranges from 50° C. to 70° C.; and/or
the hot air is blown for 5 seconds to 10 seconds.

Further, further comprising the following step: heating the inside of the cabinet shell before or after the cabinet shell enters a foaming mould.

Further, further comprising: preheating the cabinet shell before heating the inside of the cabinet shell; or
preheating the cabinet shell, putting the preheated cabinet shell into a foaming mould, and heating the inside of the cabinet shell.

Further, wherein
an outer peripheral surface of the vacuum insulation panel along its extending direction is a slope, a convex arc surface or an arc surface; or
the method for preparing the thermal insulation cabinet further comprises the following steps: adding auxiliary workpieces around the vacuum insulation panel before foaming, wherein the auxiliary workpiece comprises a first fitting surface matched with the outer peripheral surface of the vacuum insulation panel along its extension direction, a second fitting surface matched with an inner surface of the shell around the vacuum insulation panel, and a transition surface by which the first fitting surface and the second fitting surface are connected, wherein the transition surface is a plane, or a convex arc surface, or an arc surface.

Further, wherein a length L2 of the second fitting surface in a direction of the auxiliary workpiece distal from the vacuum insulation panel is not less than a length L1 of the first fitting surface in a thickness direction of the vacuum insulation panel; or
a length L2 of the second fitting surface in a direction of the auxiliary workpiece distal from the vacuum insulation panel is not less than a length L1 of the first fitting surface in a thickness direction of the vacuum insulation panel, and L2 is not more than 1.5 times of L1.

To achieve one of the above-mentioned objects of the invention, the invention also uses the following scheme:
using any of the above-mentioned methods of preparing a thermal insulation cabinet.

To achieve one of the above-mentioned objects of the invention, the invention also uses the following scheme:
A refrigerator, comprising the thermal insulation cabinet as above.

The present invention has the following beneficial effects: in the method for preparing the thermal insulation cabinet according to the present invention, by heating the inside of the cabinet shell, the inner surface of the housing, especially the side of the vacuum insulation panel facing the inner liner, can reach a target temperature required for foaming so as to reduce or avoid skinning and to further improve the insulation effect of the thermal insulation cabinet.

BRIEF DESCRIPTION OF THE DRAWINGS

For clearer descriptions of the technical solutions in the embodiments of the present invention or in the prior art, the following briefly introduces the accompanying drawings required for describing the embodiments or the prior art. Apparently, the accompanying drawings in the following descriptions show merely some embodiments of the present invention, and a person of ordinary skill in the art may still derive other drawings from these accompanying drawings without creative efforts.

DETAILED DESCRIPTION

The technical solutions of the embodiments of the present invention will be described clearly and completely with reference to the accompanying drawings in the embodiments of the present invention. It is apparent that the described embodiments are only part of the embodiments of the present invention, rather than all of the embodiments. According to the described embodiments of the present invention, all of the other embodiments obtained by a person skilled in the art without any creative work shall fall within the protection scope of the present invention.

Figure 1:
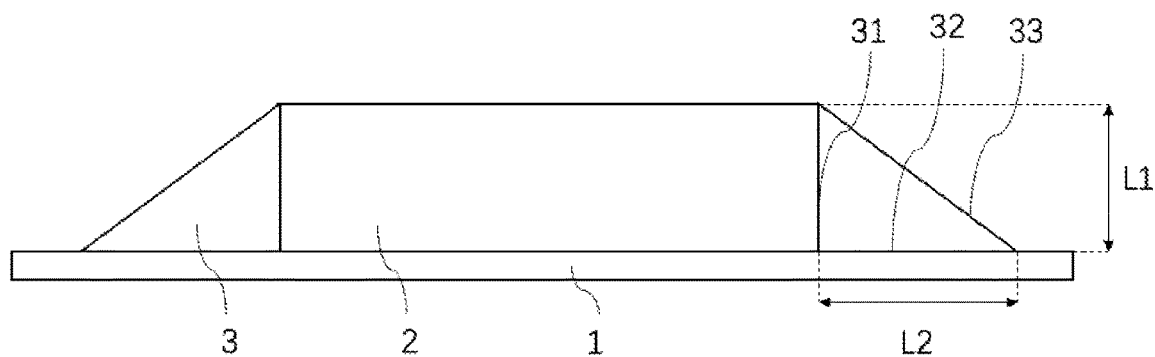
FIG. 1 is a schematic diagram showing cooperation of a housing, a vacuum insulation panel and an auxiliary workpiece according to an embodiment of the present invention.
Figure 2:
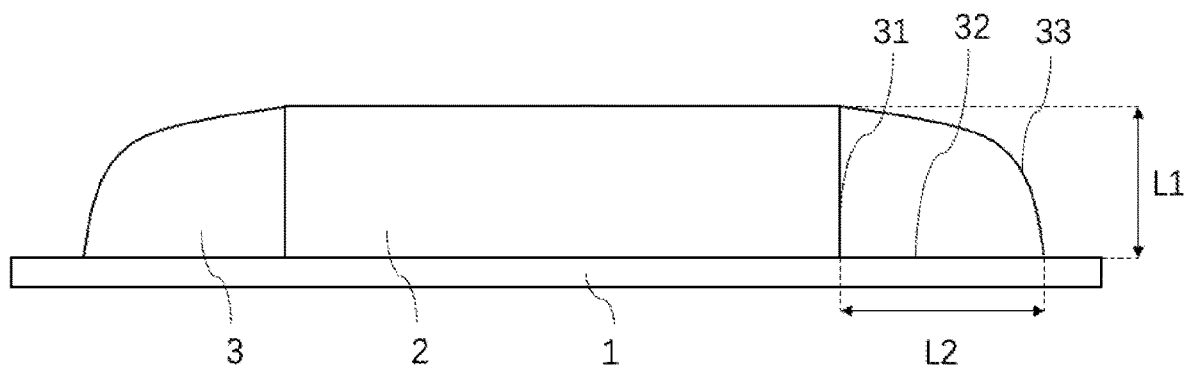
FIG. 2 is a schematic diagram showing cooperation of a housing, a vacuum insulation panel and an auxiliary workpiece according to another embodiment of the present invention.
Figure 3:
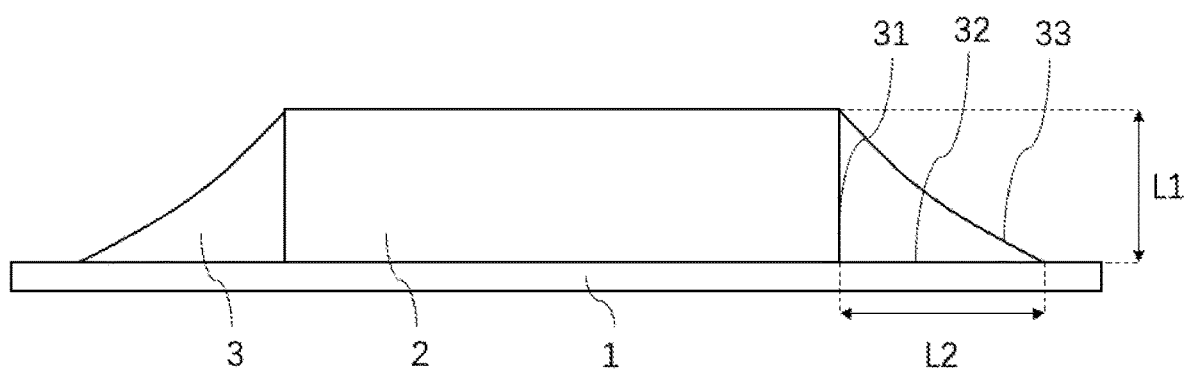
FIG. 3 is a schematic diagram showing cooperation of a housing, a vacuum insulation panel and an auxiliary workpiece according to yet another embodiment of the present invention.

Referring to FIGS. 1-3, a method for preparing a thermal insulation cabinet according to the present invention includes the following steps: pre-assembling a shell 1 having a vacuum insulation panel 2 attached to the inner side into a cabinet shell; heating the inside of the cabinet shell; and injecting a foaming material between the cabinet shell and an inner liner for foaming.

According to the method, by heating the inside of the cabinet shell, the inner surface of the shell 1, especially the side of the vacuum insulation panel 2 facing the inner liner, can reach a target temperature required for foaming, so as to reduce or avoid skinning and to further improve the insulation effect of the thermal insulation cabinet.

Specifically, the vacuum insulation panel 2 adopts a conventional structure, and the attachment position and the attachment method of the vacuum insulation panel 2 on the shell 1 belong to the prior art, which thus will not be repeated herein.

However, the inventor found in practice that after the vacuum insulation panel 2 which is generally of a square structure is attached to the shell 1, there is a height difference between the edge of the vacuum insulation panel 2 and the shell 1; and the existence of the height difference leads to a sudden change of the foaming material in a flow channel here. As a result, a vortex can be easily formed to wrap bubbles, and the density distribution range is relatively large, so it is likely to appear concave pumping here, which adversely affects the appearance of the refrigerator.

In order to improve this phenomenon, an outer peripheral surface of the vacuum insulation panel 2 along its extending direction according to the present invention is a slope, a convex arc surface or an arc surface, such that the height difference between the edge of the vacuum insulation panel 2 and the shell 1 gradually decreases. The step-by-step mitigation of the flow channel for foaming can reduce or avoid the problems of vortex, great difference of foaming density and bubble wrapping caused by the height difference in the prior art. Specifically, the conventional square vacuum insulation panel 2 may be cut or a manufacturing process of the vacuum insulation panel 2 may be improved.

Or, auxiliary workpieces 3 are added around the vacuum insulation panel 2 before foaming, and the auxiliary workpiece 3 includes a first fitting surface 31 matched with the outer peripheral surface of the vacuum insulation panel 2 along its extension direction, a second fitting surface 32 matched with an inner surface of the shell 1 around the vacuum insulation panel 2, and a transition surface 33 by which the first fitting surface 31 and the second fitting; surface 32 are connected, wherein the transition surface is a plane, or a convex arc surface, or an arc surface.

Owing to the transition surface 33, the height difference between the edge of the vacuum insulation panel 2 and the shell 1 gradually decreases, and the flow channel for foaming is mitigated step by step. In addition, the height difference is reduced step by step by the auxiliary workpiece 3, which avoids a need for improving the structure of the conventional vacuum insulation panel 2 and its preparation process.

Further, the length L2 of the second fitting surface 32 in the direction of the auxiliary workpiece 3 distal from the vacuum insulation panel 2 is not less than the length L1 of the first fitting surface 31 in the thickness direction of the vacuum insulation panel 2, such that a height difference mitigation effect is enhanced. Taking the transition surface 33 as an example of a plane, an angle formed between the plane and the shell 1 is not more than 45°.

Further, considering that the auxiliary workpiece 3 will take up part of the space, and the auxiliary workpiece 3 itself is not high in heat insulation, L2 is not more than 1.5 times of L1.

In the present invention, the inside of the cabinet shell is heated by blowing hot air to the inside at a foaming material injection hole of the cabinet shell, directly using the foaming material injection hole without forming a new inlet. Besides, workers on a foaming process line are familiar with the position, shape, size and the like of the foaming material injection hole, which is convenient for operation and control.

In a specific embodiment, hot air is blown to the inside at the foaming material injection hole by a hot air gun, and the hot air gun is directly aimed at the foaming material injection hole so that all of the hot air enters the inside of the cabinet shell, thereby saving energy.

Further, the temperature of the hot air used for heating ranges from 50° C. to 70° C.; and/or the hot air is blown for 5 seconds to 10 seconds, so as to ensure that the inner side of the shell 1 to which the vacuum insulation panel 2 is attached can reach the temperature required for foaming.

In addition, the inside of the cabinet shell can be heated at any time before the foaming material is injected. Specifically, the inside of the cabinet shell is heated before or after the cabinet shell enters a foaming mould.

Further, the method for preparing a thermal insulation cabinet further includes: preheating the cabinet shell before heating the inside of the cabinet shell. The preheating process belongs to the prior art. Heating the cabinet shell to the required temperature in advance can shorten the time for heating the inside of the cabinet shell, and ensure that the overall temperature of the cabinet shell meets the foaming requirements.

One specific process flow is described as below: after conventional preheating of the cabinet shell, the cabinet shell is put into the foaming mould, and then the inside of the cabinet shell is heated. Alternatively, after conventional preheating of the cabinet shell, the inside of the cabinet shell is heated, and then the cabinet shell is put into the foaming mould for foaming. Both of these two processes can reduce or avoid skinning.

The present invention further provides a thermal insulation cabinet obtained by adopting any of the methods for preparing a thermal insulation cabinet, and a refrigerator including the thermal insulation cabinet.

In summary, in the method for preparing a thermal insulation cabinet according to the present invention, by heating the inside of the cabinet shell, the inner surface of the shell 1, in particular the side of the vacuum insulation panel 2 facing the inner liner, can reach a target temperature required for foaming so as to reduce or avoid skinning and to further improve the insulation effect of the thermal insulation cabinet.

It should be understood that although the description is described based on the embodiments, not every embodiment includes only one independent technical solution. This statement of the description is only for clarity. Those skilled in the art should treat the description as a whole, and technical solutions in all of the embodiments may also be properly combined to form other embodiments that will be understood by those skilled in the art.

The above detailed description only aims to specifically illustrate the available embodiments of the present invention, and is not intended to limit the protection scope of the present invention. Equivalent embodiments or modifications made without departing from the spirit of the present invention shall fall within the protection scope of the present invention.

What is claimed is:

1. A method for preparing a thermal insulation cabinet, comprising the following steps:
   pre-assembling a shell having a vacuum insulation panel attached to an inner side into a cabinet shell;
   heating an inside of the cabinet shell; and
   injecting a foaming material between the cabinet shell and an inner liner for foaming;
   wherein the inside of the cabinet shell is heated by blowing hot air to the inside at a foaming material injection hole of the cabinet shell.

2. The method according to claim 1, wherein the hot air is blown to the inside at the foaming material injection hole by a hot air gun.

3. The method according to claim 1, wherein a temperature of the hot air ranges from 50° C. to 70° C.; and/or
   the hot air is blown for 5 seconds to 10 seconds.

4. The method according to claim 1, further comprising the following step: heating the inside of the cabinet shell before or after the cabinet shell enters a foaming mould.

5. The method according to claim 1, further comprising:
   preheating the cabinet shell before heating the inside of the cabinet shell; or
   preheating the cabinet shell, putting the preheated cabinet shell into a foaming mould, and heating the inside of the cabinet shell.

6. The method according to claim 1, wherein:
   an outer peripheral surface of the vacuum insulation panel along its extending direction is a slope, a convex arc surface or an arc surface; or
   the method for preparing the thermal insulation cabinet further comprises the following steps: adding auxiliary workpieces around the vacuum insulation panel before foaming, wherein the auxiliary workpiece comprises a first fitting surface matched with the outer peripheral surface of the vacuum insulation panel along its extension direction, a second fitting surface matched with an inner surface of the shell around the vacuum insulation panel, and a transition surface by which the first fitting surface and the second fitting surface are connected, wherein the transition surface is a plane, or a convex arc surface, or an arc surface.

7. The method according to claim 6, wherein a length L2 of the second fitting surface in a direction of the auxiliary workpiece distal from the vacuum insulation panel is not less than a length L1 of the first fitting surface in a thickness direction of the vacuum insulation panel; or
   a length L2 of the second fitting surface in a direction of the auxiliary workpiece distal from the vacuum insulation panel is not less than a length L1 of the first fitting surface in a thickness direction of the vacuum insulation panel, and L2 is not more than 1.5 times of L1.

8. A method for preparing a thermal insulation cabinet, comprising the following steps:
   pre-assembling a shell having a vacuum insulation panel attached to an inner side into a cabinet shell;
   heating an inside of the cabinet shell; and
   injecting a foaming material between the cabinet shell and an inner liner for foaming;
   wherein an outer peripheral surface of the vacuum insulation panel along its extending direction is a slope, a convex arc surface or an arc surface; or
   the method for preparing the thermal insulation cabinet further comprises the following steps: adding auxiliary workpieces around the vacuum insulation panel before foaming, wherein the auxiliary workpiece comprises a first fitting surface matched with the outer peripheral surface of the vacuum insulation panel along its extension direction, a second fitting surface matched with an inner surface of the shell around the vacuum insulation panel, and a transition surface by which the first fitting surface and the second fitting surface are connected, wherein the transition surface is a plane, or a convex arc surface, or an arc surface.

* * * * *